March 29, 1927.  1,622,500

C. N. FAIRCHILD ET AL

LOCK

Filed Feb. 14, 1925    3 Sheets-Sheet 1

Inventors
C. N. Fairchild,
F. J. Hull,
By H. H. Snelling
Attorney

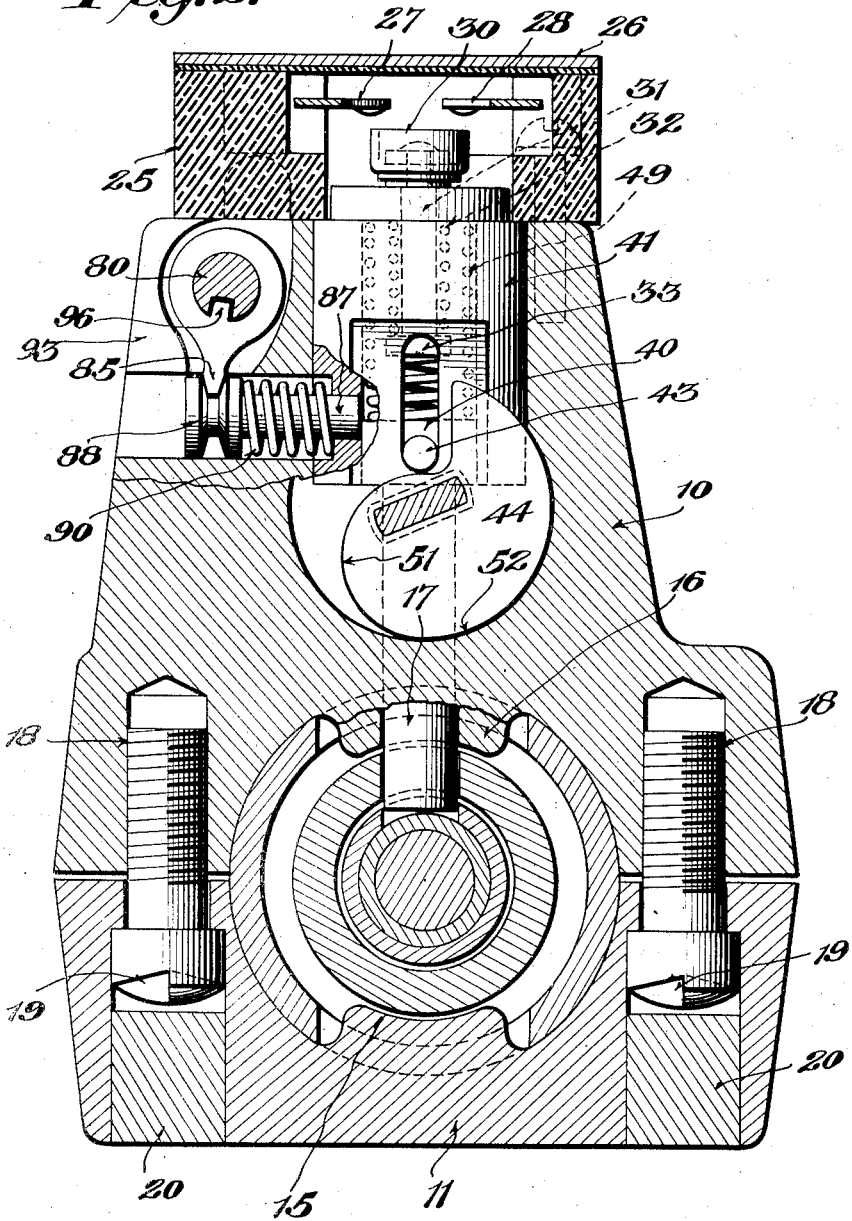

March 29, 1927.
C. N. FAIRCHILD ET AL
1,622,500
LOCK
Filed Feb. 14, 1925   3 Sheets-Sheet 3
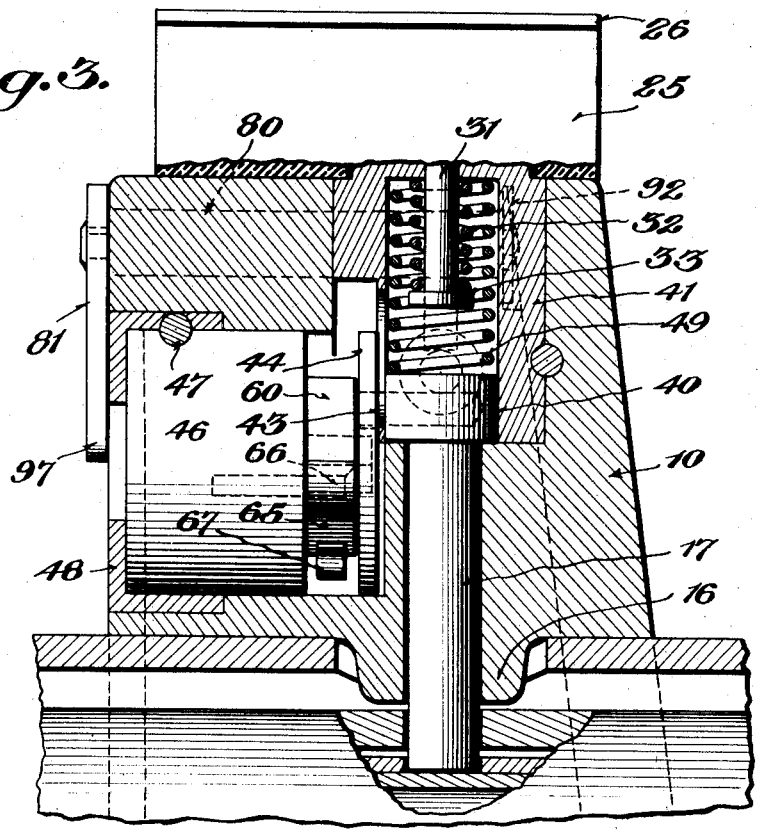
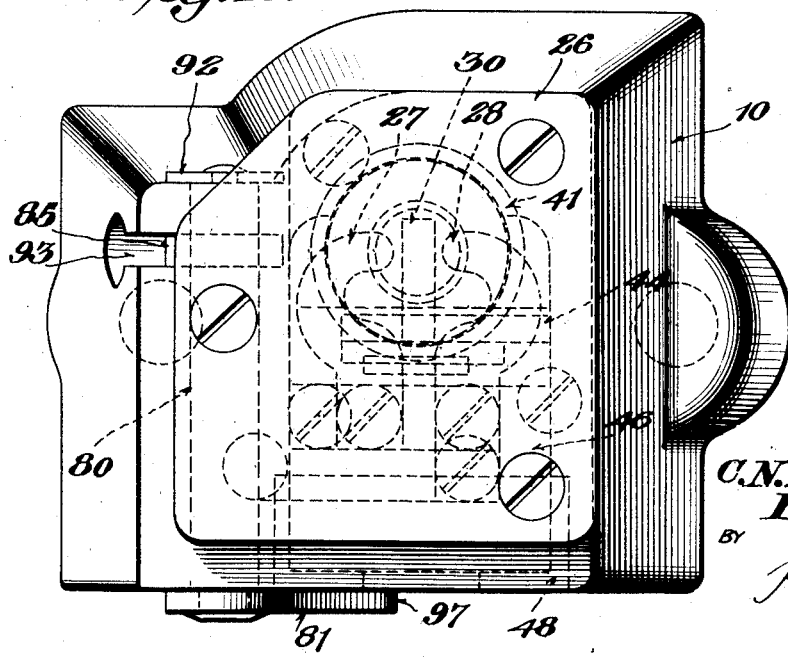
Inventors
C. N. Fairchild,
F. J. Hull,
By H. H. Snelling
Attorney Patented Mar. 29, 1927.

1,622,500

UNITED STATES PATENT OFFICE.

CHARLES N. FAIRCHILD, OF MILFORD, CONNECTICUT, AND FOSTER J. HULL, OF HAGERSTOWN, MARYLAND, ASSIGNORS TO FAIRCHILD LOCK CORPORATION, OF NEW YORK, N. Y., A CORPORATION OF DELAWARE.

LOCK.

Application filed February 14, 1925. Serial No. 9,325.

This invention relates to automobile locks and has for its principal object the provision of a lock so designed that the operator must remove the key bodily from the lock after moving it to locking position before he can lock the vehicle or shut off the ignition and in which the operator may not by any manipulation lock the vehicle without shutting off the ignition or shut off the ignition without locking the car.

In other locks manufactured by our company we have so arranged the mechanism that it is not possible to shut off the ignition without locking the car and while this is a great advantage, the underwriters desire still further protection and will not give the highest rating to a device in which it is possible by any series of acts to lock the car and yet have the ignition on. Even though only a most absent-minded or drunken driver might manipulate the present Fairchild lock in such a fashion as to shoot the bolt without cutting off the ignition, it nevertheless was possible to do this intentionally, although it could not be done unintentionally and hence conditions might possibly arise wherein the car would be going, the ignition on, so that power would be delivered, but the steering tube would lock in straight ahead position as soon as the front wheels had been brought parallel to the longitudinal axis of the car, provided that the driver had performed the series of acts necessary to accomplish this purpose, in their proper sequence.

In developing the present lock the desire has been to secure an absolute maximum of efficiency and protection thereby obtaining the highest underwriters' rating, which means that the lock must not only be automatic but thoroughly fool-proof as well as theft-proof.

In the drawings:

Figure 2 is a substantially central section taken to one side of the axis of the steering post locking bolt.

Figure 3 is a cross section at right angles to that of Figure 2.

Figure 4 is a view looking down upon the switch mechanism.

Figure 1:
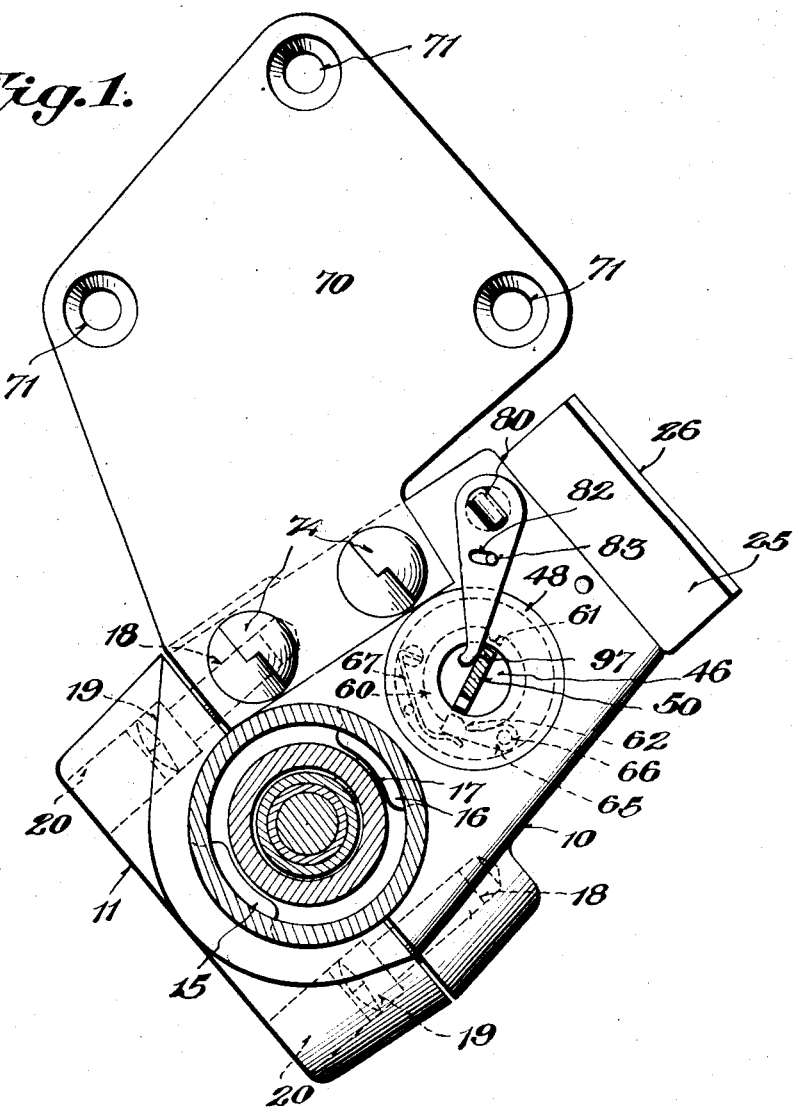
Figure 1 is a plan view of the device looking directly down the axis of the steering tube.

For convenience of description in the following specification the word "top" will be used to denote that portion of the device at which the switch box is located. As a matter of actual fact, as installed on the automobile, the device is arranged at an angle to both horizontal and vertical since the steering post casing and the instrument board are each slanted, so that in strict accuracy the top of the lock housing is the edge of the device formed by the meeting of the front face through which the key is inserted, and the switch box attaching face.

The device in general consists of a housing 10 having a housing cap 11 each having a semi-cylindrical recess therein matching to form a complete cylindrical bore receiving the steering post casing. Each of the members, 10 and 11, is provided with non-alining bosses, that of the housing cap being solid and usually an anvil 15 while the boss 16 of the main housing has a central cylindrical opening therein through which slides the steering post locking bolt 17. The cap 11 is secured to the housing 10 in any desired manner preferably by means of two one-way screws 18, the heads 19 of which seat about half way of the bores in the cap after the screws are driven home, and the remainder of these bores are then filled by plugs 20 driven in with a forced fit and finally smoothed flush to the outside of the cap.

The switch box is preferably a block of bakelite, fiber, or similar material 25 and conveniently having a brass lid 26. In this switch box are located two resilient, arcuate contact pieces 27 and 28 spaced apart a convenient distance and which when electrically connected close the ignition circuit. The wires leading to the switch box and connected to the contacts 27 and 28 preferably enter from the rear, that is behind the cowl board. The contact closing element may be of any form desired as may the contacts themselves but the parts are here shown in a form that has been found very satisfactory in practice, the closing element being a metal cup 30 carried by and insulated from the stem 31 which is urged downwardly into open circuit position by a spring 32 confined between the bottom face of the switch box and a collar 33 on the stem 31.

The locking bolt 17 has an enlarged circular head 40 freely slidable in its bore in the plug 41 but is not free to rotate since the head 40 carries a pin 43 projecting through a slot in the plug 41 so as to lie in the path of the bolt raising cam 44 fast upon the inner or rear end of the cylinder of the spring-pressed plunger type lock, the barrel of which is denoted 46 in the drawings.

The lock, or more properly speaking the barrel 46 of the lock, is held in place in a tightly fitting bore of the housing by means of a drive pin 47 which may, if desired, be slightly tapered and which, when once driven in, cannot be removed. The slightly larger counterbore of the lock barrel receiving bore in the housing is closed by a cylindrical cap 48 also held in place by the pin 47. A spring 49 engages the head 40 of the locking bolt 17 and constantly tends to shoot the bolt into locking position.

Proper movement of the cylinder of the lock by means of its key 50 turns the cam 44 so that the lug or pin 43 on the head 40 rides up the spiral arc or curve 51 to the point 52 at which time the spring 49 is compressed, the bolt 17 entirely withdrawn from locking engagement, and by means of the contact made between the head 40 of the locking bolt and the stem 31, the ignition circuit is closed. There is considerable lost motion between the bolt and stem in order to make most certain that the bolt shall be completely out of engagement with the steering post an appreciable time before the closing of the ignition circuit.

Except for rather slight details the parts so far described are not new with the present application although a number of the features are covered in pending applications. A novel and important feature of the present invention is the provision of the ratchet disk 60 which is fixed with respect to the cam 44 and the cylinder of the lock. This ratchet disk 60 carries a plurality of indentations such as 61 and 62 which are engaged by a pawl 65 pivoted as at 66 to the barrel 46 of the lock and held against the ratchet 60 or in one of the indentations if they are in registry, by means of a leaf spring 67 preferably also secured to the barrel of the lock although obviously since this is fixed with respect to the housing the spring 67 and/or the pawl may be secured to the housing.

The usual clamp or bracket for the steering post tube may conveniently be eliminated when using a lock of this type by providing a bracket 70 secured to the instrument board itself as in the standard form of bracket by fastenings passing through the recesses 71 in the plate secured to the housing 10 by recessing the housing the amount of the thickness of the plate 70 and by securing together the plate and housing by means of one-way screws 74 which preferably are given a coating of a freshly mixed putty consisting of litharge and glycerine just before they are inserted. Obviously the plate and housing may be secured together in other manners but the one described is the one preferred and is highly satisfactory.

In the upper left hand corner of the housing we provide a rock shaft 80 to one end of which is secured a lever 81 slotted as at 82 to receive a stop 83 limiting the angular movement of the lever 81 and consequently of the shaft 80 to which it is attached. Keyed upon the shaft 80 is a one toothed pinion 85 meshing with a plunger 87 having an enlarged head which may be considered a one toothed rack 88. The plunger and its head are each cylindrical and fit somewhat snugly in a bore in the housing so located that the tip of the plunger 87 may enter the path of the head of the locking bolt 17; a spring 90, however, resisting such movement, and tending to throw the plunger 87 out of its bore, which tendency in turn is resisted by the lever 81 which like the one toothed pinion 85 is non-rotatable on the shaft 80.

Some means is necessary to prevent withdrawal forwardly of the shaft 80. One method of doing this would be to pin the pinion 85 to the shaft but such a construction would render more difficult the assembly of the lock and I therefore prefer to carry the shaft 80 entirely through the housing and to head the shaft at the rear or more simply, as illustrated, to head a washer on the shaft, such for example, as shown at 92 which will permit very convenient and simple assembly by first securing together the lever 81 and the shaft 80, dropping the pinion 85 into its slot 93 so as to engage the rack, then pushing the shaft 80 through the bore in such fashion that the key groove on the shaft will receive the key projection 96 on the pawl or pinion and the washer can finally be headed against the rear end of the shaft. Obviously during the process of assembling, the plunger 87 must be held inward compressing its spring 90.

The operation of the parts is relatively simple. We will assume that the driver desires to use the car which is standing locked and with ignition off. He places the key 50 in the slot of the cylinder and turns it in the only direction possible, that is, clockwise; counter-clockwise movement not being possible because the edge of the key engages the obtuse angle 97 on the lever 81 and the stop 83 prevents any movement of the lever in a clockwise direction, the spring 90 surrounding the plunger 87 yieldingly holding the lever against its stop. Upon turning the key in a clockwise direction a resistance is felt as the pawl is withdrawn from the ratchet, and a little later a slight resistance is encountered as the cam picks up the pin of the locking bolt and ompresses the main spring. At somewhat less than 180° the locking bolt is entirely withdrawn and the ignition is turned on.

When the driver has turned the key in the lock through the full half turn or 180°, the pawl 65 engages the depression 61 in the ratchet wheel and positively prevents reverse movement of the key. The car must now remain unlocked and ignition on until the key is turned through 360° and withdrawn since the driver cannot possibly return the key owing to the locking engagement of the pawl and ratchet. This is the usual running position.

In turning the key through the next 180° the parts remain stationary, the pin of the head of the pawl riding on the circular arc 99 of the cam. Just before the key goes to the 360° point i. e., with the cylinder tumblers in registry so the key can be withdrawn, the edge of the key engages the lever 81 from the left moving the lever against the stop 83 so that further turning of the key in a clockwise direction is prevented by the locking engagement of the lever 81, and counter-clockwise movement is prevented by the engagement of the pawl 65 with the recess 62. Hence the driver must either leave the parts exactly as they are i. e., unlocked and with closed ignition, or must remove the key from the lock.

If he removes the key from the lock the lever 81 now free moves over against the stop 83 to the other limit of its travel; the spring 90 withdraws the plunger 87; this frees the locking bolt 17; and movement of the head 40 under urge of the spring 49 immediately opens the ignition circuit by the movement of the cup 30 by its spring 32.

In ordinary driving position the key is only turned on 180°. There is a decided resistance at this point due to the pawl engaging the ratchet so that the driver cannot possibly mistake the position and the key should always be in approximately this position in driving, that is turned only slightly beyond the half-way point. Beyond the 180° position the key is held by the pawl against reverse movement and the parts are in running position. Then when the driver wishes to leave the car, since he can only turn the key one direction, he makes the other half turn until the key is blocked from all movement as described, but even here the parts are still in running position, and he must remove the key from the lock before he can either lock his car or shut off his ignition and these he must do simultaneously, withdrawing the key from the lock and allowing the lever 81 to return to spring-pressed position.

What we claim is:—

1. In combination, a bolt, means for advancing said bolt, a key operated lock mechanism for retracting said bolt, and means for preventing said bolt advancing means from operating until said key is removed from said lock.

2. In combination, a key operated lock, a spring-pressed bolt retractable thereby, means for preventing movement of the bolt to locking position, and means for moving said first mentioned means to inoperative position to permit the shooting of the bolt upon withdrawal of the key from said lock.

3. In combination, a bolt, means for advancing said bolt, a key operated lock mechanism for retracting said bolt, an ignition circuit including two spaced terminals and a contact member movable into and out of engagement with said terminals to close or open said ignition circuit, means controlled by said bolt for moving said contact to circuit closing position when said bolt is retracted and for moving said contact to circuit opening position when the bolt is advanced, means governed by the presence of the key in the lock for preventing said bolt advancing means from operating until the key is removed from said lock.

4. In a mechanism for preventing the turning of a steering post with respect to its tube, a housing fixed to said tube, a bolt therein adapted to engage said post to prevent turning, a spring for advancing said bolt to engage said post, a key controlled bolt retracting mechanism, and means for delaying the advance of said bolt under urge of said spring until removal of the key from the retracting mechanism.

5. In combination, a circuit make and break mechanism, a bolt mechanism, a key controlled lock mechanism, means carried by said lock for retracting said bolt and closing said circuit, resilient means for advancing said bolt and opening said circuit, and mechanism for withholding said resilient means while the key is in the lock.

6. In combination, a spring-pressed bolt, an ignition circuit make and break mechanism, a key controlled means for retracting said bolt and for closing said mechanism, means for preventing the opening of the circuit while the bolt is retracted and for preventing the advancing of the bolt while the key is in the lock.

7. In combination, a spring-pressed bolt, an ignition circuit make and break mechanism, a key controlled means for retracting said bolt and for closing said mechanism, means for preventing the opening of the circuit while the bolt is retracted and for preventing the advancing of the bolt while the key is in the lock and means for preventing reverse rotation of the key.

8. A lock having a rotating portion, a bolt retracted thereby, a spring for advancing said bolt, and means for preventing rotation of said portion reversely to the direction of rotation to retract said bolt.

9. A lock having a rotating portion, a bolt retracted thereby, a spring for advancing said bolt, means for preventing rotation of said portion reversely to the direction of rotation to retract said bolt, means operative at the complete revolution of the key to prevent any movement of the key except its withdrawal from the lock.

10. In combination, a steering post column having a plurality of holes therein, a lock housing engaging a portion of the surface of said casing and having a perforated boss fitting within one of said holes, a housing cap or cover member engaging a further portion of the outer surface of said casing and having a boss fitting within the other of said holes, a bolt sliding within said perforation, and means for permanently securing together said housing and cap.

11. The combination of claim 10 in which the two bosses each have a cylindrically concave face to engage the steering post to limit its movement with respect to the casing.

12. In a device of the character described, a headed bolt, a spring acting to advance said bolt, a plunger movable into the path of the head when the bolt is retracted, a pawl for operating said plunger, a key operated lock for retracting the bolt, a rock shaft, an arm on said rock shaft in the path of movement of the key and forming with said pawl a bell crank lever, means operating to hold said lever in the path of the key when rotating to retract the bolt so that movement of the key will rock the lever, and a hook on said arm to prevent rotation of the key beyond withdrawal position.

In testimony whereof we affix our signatures.

CHARLES N. FAIRCHILD.
FOSTER J. HULL.